(12) United States Patent
Labbe

(10) Patent No.: US 9,316,122 B2
(45) Date of Patent: *Apr. 19, 2016

(54) FEEDWATER HEATER CONTROL SYSTEM FOR IMPROVED RANKINE CYCLE POWER PLANT EFFICIENCY

(75) Inventor: Donald E. Labbe, Woburn, MA (US)

(73) Assignee: Invensys Systems, Inc., Foxboro, MA (US)

( * ) Notice: Subject to any disclaimer, the term of this patent is extended or adjusted under 35 U.S.C. 154(b) by 923 days.

This patent is subject to a terminal disclaimer.

(21) Appl. No.: 12/973,777

(22) Filed: Dec. 20, 2010

(65) Prior Publication Data

US 2012/0151926 A1 Jun. 21, 2012

(51) Int. Cl.
*F01K 23/06* (2006.01)
*F01K 7/40* (2006.01)

(52) U.S. Cl.
CPC .......................................... *F01K 7/40* (2013.01)

(58) Field of Classification Search
USPC ...................................................... 60/645–681
See application file for complete search history.

(56) References Cited

U.S. PATENT DOCUMENTS

| | | | | |
|---|---|---|---|---|
| 1,769,457 A | * | 7/1930 | Powell | 60/677 |
| 3,244,898 A | * | 4/1966 | Hickox | 290/2 |
| 3,289,408 A | | 12/1966 | Silvestri, Jr. | |
| 3,485,048 A | * | 12/1969 | Miliaras | 60/652 |
| 3,488,961 A | | 1/1970 | Gerber | |
| 3,518,830 A | | 7/1970 | Viscovich et al. | |
| 3,835,650 A | | 9/1974 | Chesmejef | |
| 3,894,396 A | * | 7/1975 | Durrant | F01K 13/02 60/665 |
| 3,922,859 A | | 12/1975 | Durrant et al. | |
| 3,939,328 A | | 2/1976 | Davis | |
| 4,000,037 A | | 12/1976 | Nusbaum | |
| 4,003,205 A | * | 1/1977 | Matsumura | F01K 7/40 60/646 |
| 4,343,682 A | | 8/1982 | Grimes et al. | |
| 4,651,533 A | * | 3/1987 | Ura et al. | 60/678 |
| 5,836,162 A | * | 11/1998 | Haynes | F01K 7/40 60/663 |

(Continued)

OTHER PUBLICATIONS

Office action issued Apr. 12, 2013 in related U.S. Appl. No. 13/187,489, 32 pgs.

(Continued)

*Primary Examiner* — Thomas Denion
*Assistant Examiner* — Mickey France
(74) *Attorney, Agent, or Firm* — Thomas J. Roth, Esq.

(57) ABSTRACT

A steam cycle system comprises a boiler comprising a superheat section, a reheat section, and an economizer section, wherein the boiler is configured to receive a feedwater stream; a steam turbine system comprising a high pressure turbine and a lower pressure turbine, wherein the steam turbine system is configured to receive steam generated by the boiler; a condenser configured to receive at least a portion of the outlet steam from the steam turbine system and output the feedwater stream; a high pressure feedwater heat exchanger configured to receive at least a portion of the feedwater stream, allow for an energy exchange between the portion of the feedwater stream and a steam stream, and output the portion of the feedwater stream to the boiler; a steam extraction line configured to provide a steam flow from an outlet of the high pressure turbine to the high pressure feedwater heater; a feedwater temperature control device configured to control the temperature of the feedwater stream by modulating the energy transfer in the high pressure feedwater heat exchanger between the steam flow provided through the steam extraction line and the portion of the feedwater received by the high pressure feedwater heat exchanger.

27 Claims, 6 Drawing Sheets

(56) References Cited

U.S. PATENT DOCUMENTS

| | | | |
|---|---|---|---|
| 6,233,939 B1 | 5/2001 | Ngo-Beelmann et al. | |
| 8,091,361 B1 | 1/2012 | Lang | |
| 2004/0105518 A1 | 6/2004 | Abel et al. | |
| 2011/0314819 A1* | 12/2011 | Muthuramalingam | ... F01K 7/34 60/678 |

OTHER PUBLICATIONS

The Coast Guard Journal of Safety & Security at Sea, Proceedings of the Marine Safety & Security Council, Lessons Learned from U.S. Coast Guard Casualty Investigations, Nautical Engineering Queries, Proceedings, Summer 2006, www.uscg.mil/proceedings, pp. 80-81.

Notice of Allowance for U.S. Appl. No. 13/187,489 dated Mar. 20, 2015, 10 pages.

Final Office Action for U.S. Appl. No. 13/187,489 dated Nov. 7, 2013, 30 pages.

Non-Final Office Action for U.S. Appl. No. 13/187,489 dated Apr. 15, 2014, 29 pages.

Final Office Action for U.S. Appl. No. 13/187,489 dated Nov. 5, 2014, 33 pages.

* cited by examiner

FEEDWATER HEATER CONTROL SYSTEM FOR IMPROVED RANKINE CYCLE POWER PLANT EFFICIENCY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The simple steam cycle is one of the main processes for producing electricity, and power plants of various ages are being operated using the simple steam cycle, also to produce power. In some contexts, the simple steam cycle may be referred to as a Rankine cycle. The simple steam cycle generally refers to a system having a boiler producing steam, a steam turbine that converts the steam to mechanical energy, a generator that converts the mechanical energy to electrical energy, and a condenser for absorbing waste heat and recycling the water within the system. While newer power plants may have more energy efficient features, the efficiency of the fuel to electricity conversion of the steam cycle still only averages from about 35% to about 40% in practice. Improvements in the efficiency of the system have generally focused on energy recovery. For instance, feed water heating using steam from the steam turbines has been used to increase the feedwater temperature to the boiler, increasing the efficiency of the steam production in the boiler. However, existing plants may have limited options for improving the energy efficiency of the system due to constraints on the feasibility of retrofitting existing equipment. Common efficiency boosting designs may only be available upon the replacement of major system components, leading to significant costs and lost operating time during the retrofitting process.

In addition, the operation of a steam cycle power plant must consider the environmental effects of pollutant emissions from the boiler. A number of pollutants can be produced by the combustion of fuel in the boiler including carbon monoxide, carbon dioxide, sulfur dioxide, and nitrogen oxides (NOx). In some instances, attempts at increasing the efficiency and/or output of the system can result in increased pollutant production.

SUMMARY

In an embodiment, a steam cycle system comprises a boiler comprising a superheat section, a reheat section, and an economizer section, wherein the boiler is configured to receive a feedwater stream; a steam turbine system comprising a high pressure turbine and a lower pressure turbine, wherein the steam turbine system is configured to receive steam generated by the boiler; a condenser configured to receive at least a portion of the outlet steam from the steam turbine system and output the feedwater stream; a high pressure feedwater heat exchanger configured to receive at least a portion of the feedwater stream, allow for an energy exchange between the portion of the feedwater stream and a steam stream, and output the portion of the feedwater stream to the boiler; a steam extraction line configured to provide a steam flow from an outlet of the high pressure turbine to the high pressure feedwater heater; a feedwater temperature control device configured to control the temperature of the feedwater stream by modulating the energy transfer in the high pressure feedwater heat exchanger between the steam flow provided through the steam extraction line and the portion of the feedwater received by the high pressure feedwater heat exchanger.

In an embodiment, a method of operating a steam cycle power plant comprises producing steam in a boiler, wherein the boiler comprises a superheat section, a reheat section, a boiling section, and an economizer section; transferring the steam to a steam turbine system comprising a high pressure turbine and a lower pressure turbine; condensing at least a portion of the steam passing out of the steam turbine system to form a feedwater stream; transferring at least a portion of the feedwater stream and a portion of the outlet steam from the steam turbine system to the high pressure feedwater heater; contacting the portion of the outlet steam and the feedwater stream in the high pressure feedwater heater to transfer energy between the portion of the outlet steam and the feedwater stream; transferring the portion of the feedwater stream from the high pressure feedwater heater to the boiler; and controlling the energy transfer between the portion of the outlet steam and the feedwater stream to control the temperature of the feedwater stream received by the boiler.

In an embodiment, a method of controlling a steam cycle power system comprises measuring a feedwater stream temperature at the entrance to a boiler in a steam cycle power system; measuring a superheat steam temperature at an outlet of the boiler; measuring a reheat steam temperature at an outlet of the boiler; controlling the feedwater stream temperature to: allow the superheat steam temperature to meet a superheat steam temperature setpoint; and allow the reheat steam temperature to meet the reheat steam temperature setpoint.

In an embodiment, a method of controlling a steam cycle power system comprises measuring a feedwater stream temperature at the entrance to a boiler in a steam cycle power system; measuring a superheat steam temperature at an outlet of the boiler; measuring a reheat steam temperature at an outlet of the boiler; measuring the electric load generation of the power plant; controlling the feedwater stream temperature by modulating the steam flow to a high pressure feedwater heater to adjust the electric load generation of the power plant.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
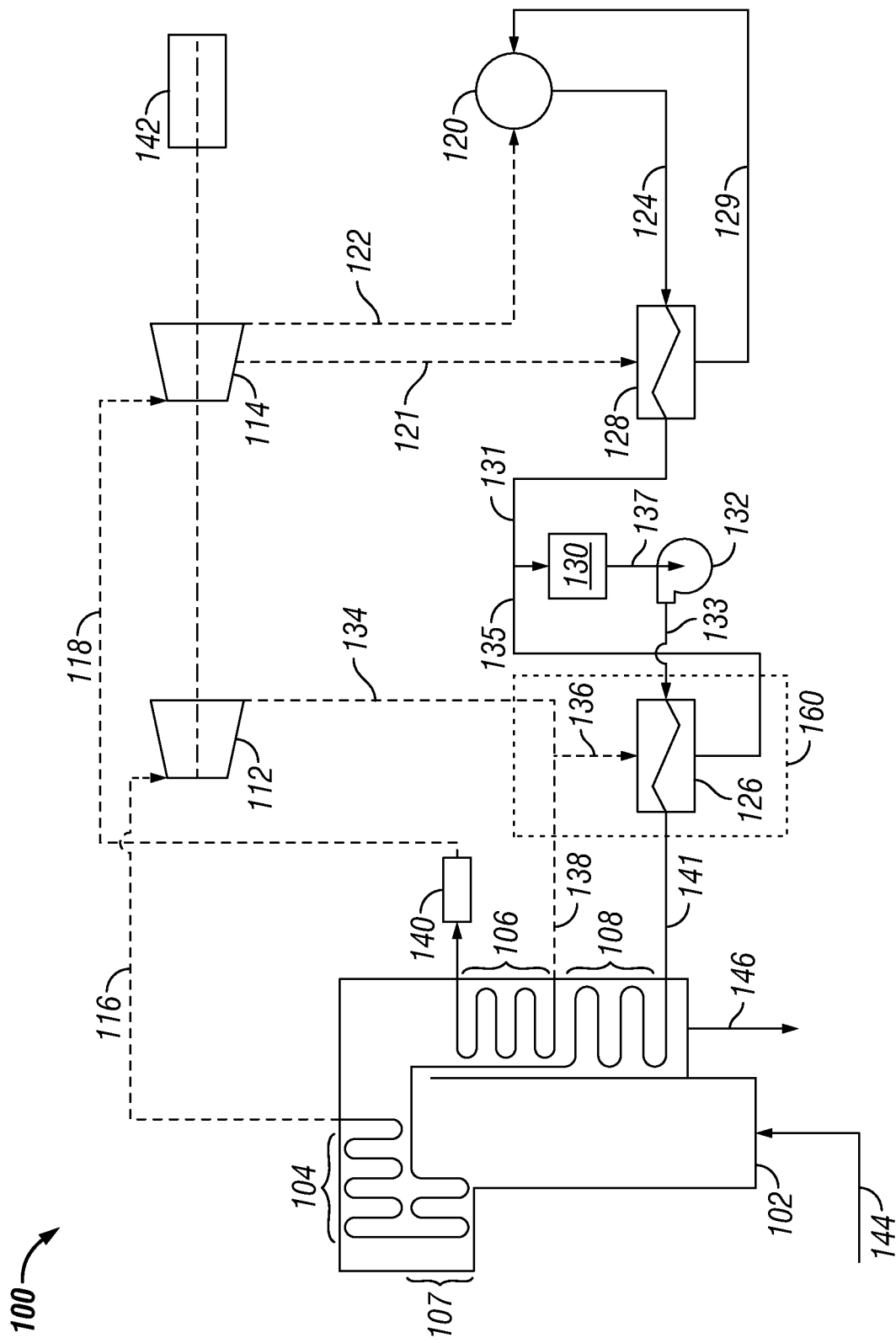
FIG. 1 is an illustration of a schematic flow diagram of an embodiment of a steam cycle system.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The use of the system and methods disclosed herein may allow for the overall efficiency of the steam cycle system to be increased. The efficiency of the steam cycle system and the net power production of a power plant may depend on many parameters. For example, the temperature of the superheat and reheat steam leaving the boiler and the temperature of the feedwater entering the boiler can affect the efficiency of the system. Boilers used in the steam cycle system can have multiple sets of tubes useful for various purposes including boiling the water in radiant water wall tubes and convective tube banks, superheating the steam in a superheat section comprising panels and tube banks, and reheating the steam in a reheat section of tube banks. Economizer sections have been implemented in some steam cycle systems to increase the temperature of the feedwater entering the boiler using the outlet gases from the boiler. The economizer sections can increase the efficiency of the boiler, but can also result in a decrease in the efficiency of the overall steam cycle system, which has not previously been appreciated by those of ordinary skill in the art. The heat transfer surface areas of each section installed in a boiler are fixed upon installation, limiting the ability to adjust the heat distribution to the various sections. Changing the load production rate for the unit or changing the fuel quality (e.g., the heating value) may entail the application of one or more steam temperature control devices to maintain peak unit performance by holding the superheat and reheat steam temperatures at their respective setpoints, as described in more detail herein.

While these steam temperature control devices may be useful in maintaining the superheat and reheat steam temperatures at their respective setpoints, some boilers may not be able to achieve the respective superheat and reheat steam temperature setpoints across the entire unit load range. One particular problem may be the achievement of superheat steam temperature setpoint at very high loads. Due to boiler and turbine cycle characteristics, the proportion of boiler energy supplied to the superheating function may be reduced with increasing load. For example, the inclusion of an economizer section in a boiler can increase the steam production rate at the cost of decreasing the amount of heat available for superheating, which may limit the ability to superheat the steam in the boiler. As a result, the superheat steam temperatures may decrease below the superheat steam temperature setpoint, which may cause the load generation potential and the cycle efficiency to be reduced. In other words, this condition can be characterized by a disproportionate amount of steam generation as compared to superheating of the steam.

The imbalance between steam generation and superheating of the steam may be corrected or reduced by modulating the temperature of the feedwater to the boiler in accordance with the methods and systems disclosed herein. As used herein, the terms "modulate" and "modulating" refer to the manipulation of a variable and/or device in a controlled fashion over a desired range, which can include a fully opened position, a fully closed position, and a full range between these two positions. In an embodiment, the temperature of the feedwater may be reduced, which can result in a decrease in the efficiency of the boiler. However, in an embodiment, a decrease in efficiency resulting from a decrease of the temperature of the feedwater fed to the boiler may be more than offset by an increase in the overall steam cycle efficiency resulting from the superheat and reheat steam setpoints being maintained and limiting the use of any efficiency-decreasing steam temperature control devices. Thus, the systems and methods disclosed herein may be used to increase the efficiency of the steam cycle system by decreasing the efficiency in the boiler, which is in contrast to the accepted wisdom of maximizing the efficiency of each section of the steam cycle system. The system and methods described herein also may be used to improve the efficiency of alternative fuels, thus allowing the use of said alternative fuels to promote increased economic efficiency and/or reduction of pollutant emissions. The allowable fuel quality for satisfactory cycle efficiency and/or pollutant emissions may be limited by the physical boiler design, as defined by the relative surface area of boiler components, such as the superheat section, reheat section, evaporator section, and economizer section. Application of system and method disclosed herein may expand permissible fuel quality range for fuel cost, efficiency, and/or environmental benefits.

In addition to the efficiency considerations, the methods and systems disclosed herein may allow for the peak power capability of a plant to be increased and/or maximized while maintaining the system parameters within allowable limits. Additional power may be needed in a variety of circumstances. For example, if another power plant were to go offline, additional power may be required to meet the load requirements from the remaining plants in order to prevent brown outs or black outs. As described in more detail below, the system and methods disclosed herein may be used to increase the peak power production of a steam cycle system by lowering the steam flow to the highest pressure feedwater heater in a controlled manner considering the limitations of the boiler, (e.g., such as maintaining the temperature of the superheat steam at or near the setpoint), and the limitations of the turbine (e.g., such as low pressure turbine steam pressure and/or flow limits). While an increase in the peak power may lower the operating efficiency, a significant quantity of additional power generation may be made available to the grid.

Further, the system and methods disclosed herein may be used to limit or reduce the emissions produced by the steam cycle system. Pollutants may be produced due to the combustion of fuel in the boiler to produce steam. The ability to control the temperature of the feedwater transferred to the boiler may allow the fuel combustion characteristics in the boiler to be adjusted to reduce or limit the amount of pollutants produced and may allow alternative fuels to be applied, including a blend of fuels.

Turning now to FIG. 1, an embodiment of a steam cycle system 100 for producing electricity is illustrated. In some contexts, the steam cycle system 100 may be referred to as being an instance of a Rankine cycle system. As shown in FIG. 1, the steam cycle system 100 generally comprises a boiler 102, a steam turbine system. a condenser 120, a high pressure feedwater heater 126, and an outlet steam line 134 for providing steam from a high pressure turbine 112 to the high pressure feedwater heater 126. In an embodiment, a feedwater temperature control device (not shown) may be incorporated into the steam cycle system 100 in order to control the temperature of the feedwater stream received by the boiler 102 in a controlled fashion, as described in more detail below.

The boiler 102 comprises any boiler, heat exchanger, and/or boiler means configured to transfer heat from a heat source to a fluid stream, thereby producing steam for use in the steam cycle system 100. In an embodiment, the heat source may be derived from the combustion of a fuel with oxygen, which may both enter the boiler 102 through line 144. Suitable fuel sources may include, but are not limited to, any fossil fuel (e.g., natural gas, fuel oil, coal), or any other combustible materials (e.g., organic matter such as waste wood, waste products such as refuse) suitable for use in producing heat, and any combinations thereof. Further, the fuel quality used to produce heat may affect the amount of heat available for transfer to the fluid in the boiler 102.

The boiler 102 used in the steam cycle system 100 may have multiple sets of tubes useful for various purposes including preheating the feedwater in an economizer section 108, boiling the water in a boiling section 107 comprising radiant water wall tubes and convective tube banks, superheating the steam in a superheater section 104 comprising panels and tube banks, and reheating the steam in a reheater section 106 comprising tube banks. The heat transfer surface areas of these sections are fixed upon installation, limiting the ability to adjust the heat distribution to the various sections. The boiler 102 may be designed to produce steam at a designated temperature setpoint, which may comprise any number of variables including, but not limited to, temperature, pressure, and/or flowrate. In an embodiment, the setpoints are the design variables (e.g., temperatures) for the boiler and steam turbine considering the boiler and steam turbine material limitations. In general, the steam cycle system 100 is controlled to obtain the highest steam temperature up to the superheat temperature setpoint to improve the steam cycle system efficiency. In an embodiment, the term "meeting" when used in relation to the setpoint refers to the average value of the setpoint variable of a given stream being within 0.1%, or alternatively within 0.2% of the designated setpoint value.

The boiler 102 also may comprise various steam temperature control devices or means (not shown) for adjusting the outlet temperature of the various steam streams (e.g., the superheat steam stream and the reheat steam stream) in order to meet the setpoint. The extent to which these devices can adjust the outlet temperature of the various steam streams is limited based upon the particular boiler design and may impact the types and amounts of pollutants created during the combustion of the fuel. For example, adjusting the burner tilts for higher outlet steam temperatures may result in an increase in the combustion zone temperature in various orientations, resulting in increased $NO_x$ emissions in the boiler flue gas 146. In another example, selecting the coal mills in service and thereby selecting the number and location of burners in service for outlet steam temperature control of the superheat stream and reheat stream may result in increased $NO_x$ emissions in the boiler flue gas 146. In another example, the selection of the fuel quality through blending of fuels for outlet steam temperature control of the superheat stream and reheat stream may result in increased $NO_x$ emissions in the boiler flue gas 146. Suitable steam temperature control devices may include, but are not limited to, superheat and reheat sprays (e.g., reheat sprays 140 shown in FIG. 1) that mix water with the steam to cool the boiler outlet steam, gas path dampers to adjust the gas flow rate between heat transfer surfaces and the heat absorption in the burner zone section of the furnace, burner tilts to adjust the angle of fuel and air injection in the furnace, gas recirculation devices, selective operation devices for controlling the number of burners in service, selection of the fuel quality through blending, and any combinations thereof.

The steam cycle system 100 also comprises a steam turbine system comprising a plurality of turbines that receive the steam produced by the boiler 102 and produce mechanical work. The mechanical work is then transferred along a shaft, which may be a common shaft among the plurality of turbines, to a generator 142 for producing electrical energy from the mechanical energy. The number of turbines present in the system can vary based on the required energy output of the plant and the remaining system components (e.g., the rated steam output of the boiler 102). Each turbine present in the steam turbine system 100 may have high and low load limits that set practical throughput limits of steam. For example, a steam throughput above the high load limit may not produce a significant amount of additional mechanical work. The load limits for each turbine are determined in part by the design of the turbine and are therefore somewhat fixed once the turbine is installed.

In an embodiment, the steam turbine system comprises a high pressure turbine 112 and a lower pressure turbine 114. In an embodiment, the lower pressure turbine 114 operates at a lower inlet pressure than the outlet pressure of the high pressure turbine 112. In an embodiment as shown in FIG. 1, the high pressure turbine 112 receives superheated steam from boiler 102 through line 116. The superheated steam may expand through the high pressure turbine 112 to produce mechanical work before exiting the high pressure turbine 112 through the outlet steam line 134. As used herein, the term "outlet" when used in reference to one or more steam turbines may refer to any outlet of the steam turbine, including a final outlet of the steam turbine and/or any outlet from an inlet or intermediate stage of a steam turbine. Outlet steam line 134 may be split between a return stream passing through line 138 that enters the reheater section 106 of the boiler 102 and becomes a reheat stream passing through line 118, and a second portion of the outlet stream passing through outlet steam line 134 may be split and become the steam extraction line 136. The steam extraction line 136 may provide steam from the high pressure turbine 112 to the high pressure feedwater heater 126, as described in more detail below. In some embodiments, one or more shut-off valves may be disposed in lines 134, 138, and/or steam extraction line 136. These shut-off valves may perform the role of protecting the steam turbine from damage due to water induction during upset conditions. For example, when the steam turbine trips and its inlet valves close, the turbine pressures drop to near condenser pressure. The shut-off valves may be forced closed to prevent the high pressure/temperature saturated water within the feedwater heaters from surging from the higher pressure feedwater heaters to the very low pressure turbine. These valves are normally wide open during operation, which is to say that they do not restrict the flow of fluids during normal operation. These valves could be completely shut off in the event of a system upset condition.

In an embodiment, the lower pressure turbine 114 may receive the reheat stream passing through line 118 from the boiler 102. The steam in the reheat stream passing through line 118 may expand through the lower pressure steam turbine 114 to produce mechanical work before exiting the turbine as output stream in line 122. Line 122 may pass to a condenser 120 where the steam is condensed to form a liquid. In some embodiments, an optional steam stream may pass through line 121 to a lower pressure feedwater heater 128 to preheat the liquid condensed in the condenser 120 prior to the liquid passing through the remainder of the system to the boiler 102 as the boiler feedwater stream.

In an embodiment, the steam cycle system 100 comprises a feedwater heating system for pre-heating the liquid condensed in the condenser 120 prior to the liquid passing to the boiler 102. The feedwater heating system may comprise a number of heat exchangers, deaerators, and pumps for heating and transferring the feedwater to the boiler 102 at a desired temperature and a suitable pressure. The feedwater heaters may comprise any type of heat exchanger or heat exchanger means for transferring heat between a steam stream and a liquid stream. The feedwater heaters may utilize one or more steam streams taken from the steam turbine system to provide the energy for heating the feedwater. The number of feedwater heaters in a given steam cycle system may depend on the number of turbines, the temperature rise desired, the characteristics of the heat exchangers used to heat the feedwater, and any other considerations known to one of ordinary skill in the art. While only one lower pressure feedwater heater and one high pressure feedwater heater are illustrated in FIG. 1, a plurality of heaters may be used in accordance with the teachings disclosed herein, as would be apparent to one of ordinary skill in the art with the benefit of this disclosure.

In an embodiment as shown in FIG. 1, the feedwater heating system comprises the lower pressure feedwater heater 128 that receives the liquid condensed in condenser 120 and indirectly contacts the liquid with steam passing through line 121. For example, the lower pressure feedwater heater 128 may comprise a shell and tube heat exchanger with the condensed liquid passing through the interior of the tubes and the steam from line 121 passing between the interior of the shell and the exterior of the tubes. As a result of the contact in the lower pressure feedwater heater 128, the steam may condense in the lower pressure feedwater heater 128 to form a liquid, which may pass to the condenser 120 through line 129 to become part of the condensed liquid passing through line 124. The heated feedwater leaving the lower pressure feedwater heater 128 through line 131 may pass to a deaerator 130, where any air entrained in the feedwater may be removed prior to the feedwater passing through line 137 to the feedwater supply pump 132. The feedwater supply pump 132 may increase the pressure of the feedwater to a desired pressure.

In an embodiment, the feedwater may pass from the feedwater supply pump 132 through line 133 to the high pressure feedwater heater 126, which is configured to receive at least a portion of the feedwater passing to the boiler 102 through line 141. In some embodiments, the high pressure feedwater heater 126 may comprise a shell and tube heat exchanger with the feedwater passing through the interior of the tubes and the steam from steam extraction line 136 passing between the interior of the shell and the exterior of the tubes. As a result of the contact in the high pressure heater, the steam may condense in the high pressure feedwater heater 126 to form a liquid, which may pass to the deaerator 130 through line 135 to become part of the feedwater stream entering feedwater supply pump 132. The heated feedwater leaving the high pressure feedwater heater 126 through line 141 may pass to the boiler 102 to complete the steam cycle process.

In an embodiment, the steam cycle system 100 comprises a feedwater temperature control device or a feedwater temperature control means configured to control the temperature of the feedwater stream received by the boiler 102. In an embodiment, the feedwater temperature control device or feedwater temperature control means is capable of controlling the amount of energy transferred from a steam stream to the feedwater stream in the high pressure feedwater heater 126. The control of the temperature of the feedwater stream may allow the superheat steam temperature to meet the superheat steam temperature setpoint, the reheat steam temperature to meet or exceed the reheat steam temperature setpoint, and reduce or minimize the reheat spray flow rate. As a result, the overall steam cycle system 100 efficiency may be increased relative to a process without a controlled feedwater stream temperature.

Figure 2:
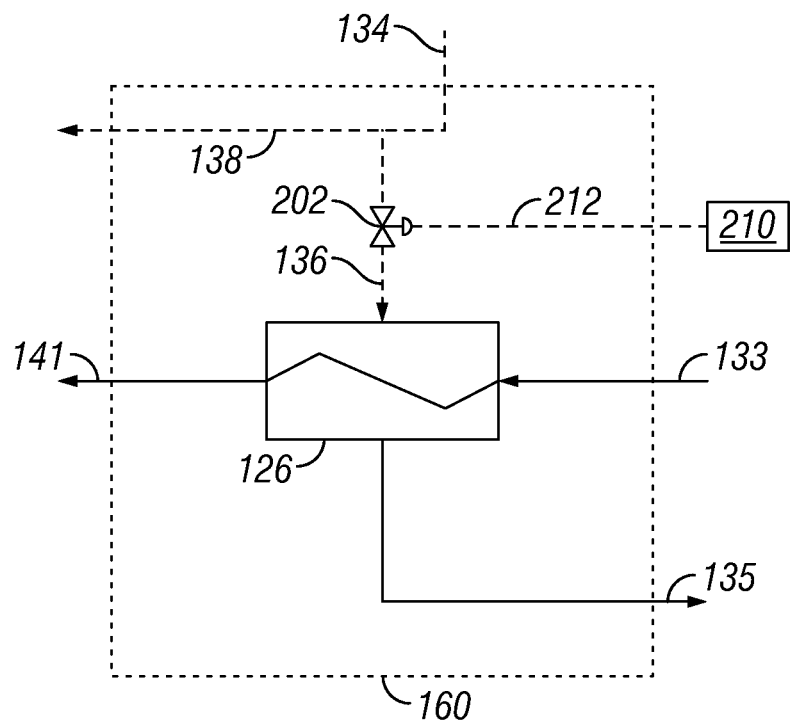
FIG. 2 is an illustration of a schematic flow diagram of an embodiment of a feedwater temperature control device.

FIG. 2 represents a close-up view of the area 160 containing the high pressure feedwater heater 126 and the associated equipment and piping. In the embodiment shown in FIG. 2, the feedwater temperature control device may comprise a first control valve 202 disposed in the steam extraction line 136 upstream of the high pressure feedwater heater 126 and downstream of the split between the outlet steam line 134 from the high pressure turbine 112 and the reheat steam stream passing through line 138. In an embodiment, the first control valve 202 can be used to control the amount of energy transferred between the steam passing through steam extraction line 136 and the feedwater passing through the high pressure feedwater heater 126. In an embodiment, the first control valve 202 may allow for a modulation of the steam flow through steam extraction line 136 to the high pressure feedwater heater 126. Since the steam passing through steam extraction line 136 provides the energy input to the high pressure feedwater heater 126, a decrease in the flowrate of steam through extraction line 136 as controlled by first control valve 202 can result in a decrease of the energy transfer to the feedwater leaving the high pressure feedwater heater through line 141. In an embodiment, a decrease in the energy transferred to the feedwater from the steam passing through steam extraction line 136 can result in a decrease in the outlet temperature of the feedwater passing to the boiler 102. In an embodiment, the use of the first control valve 202 in the steam extraction line 136 may allow the steam flow rate to be controlled from about 0% to about 100% of the flow that would otherwise occur in the absence of a control valve on a volumetric basis. The first control valve 202 may be controlled by and/or receive a control signal from a control system 210 through control line 212, as described in more detail below.

Figure 3:
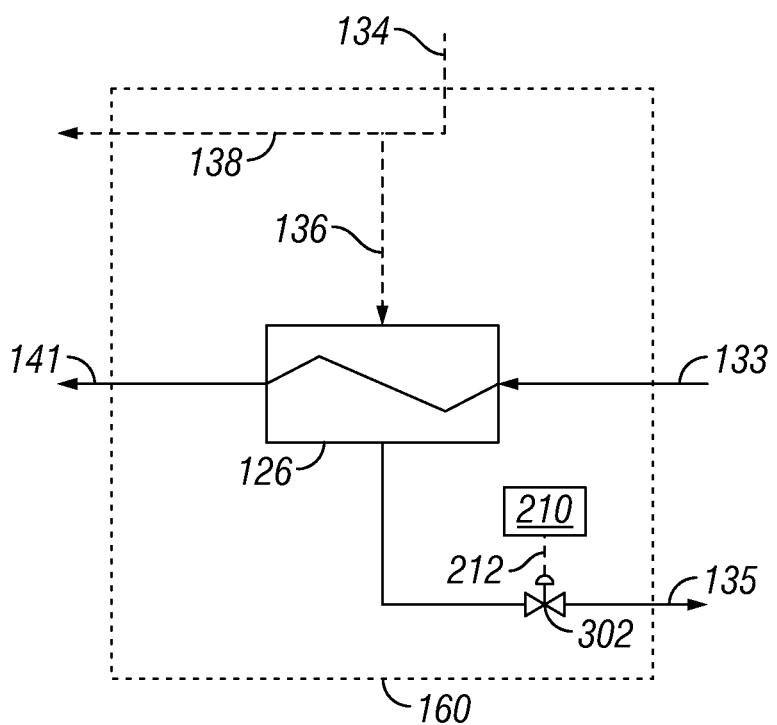
FIG. 3 is an illustration of a schematic flow diagram of another embodiment of a feedwater temperature control device.

In another embodiment as shown in FIG. 3, the feedwater temperature control device may comprise a second control valve 302 for controlling the flow of the condensed steam in the high pressure water heater 126 passing through line 135. In an embodiment, the second control valve 302 can be used to control the setpoint of the liquid level height in the high pressure water heater 126, thereby controlling the amount of energy transferred between the steam passing through steam extraction line 136 and the feedwater passing through the high pressure feedwater heater 126. In an embodiment, the second control valve 302 may allow for a modulation of the liquid flow leaving the high pressure feedwater heater 126 through line 135 and the liquid level setpoint within the high pressure feedwater heater 126. In an embodiment, the steam supplied through steam extraction line 136 condenses within the high pressure feedwater heater 126 and is maintained at the controlled liquid level. A level sensor (not shown) may be used to measure the liquid condensed in the high pressure feedwater heater 126. As the liquid level within the high pressure feedwater heater rises, the liquid will cover the tubes carrying the feedwater and reduce the surface area available for heat transfer with the steam supplied through steam extraction line 136. This resulting decrease in surface area can result in a decrease in steam consumption (e.g., condensation rate) in the high pressure feedwater heater 126 and a corresponding decrease in the temperature of the outlet feedwater through line 141. As a result of the use of second control valve 302 to control the liquid level setpoint, the flowrate of the steam through steam extraction line 136 may be controlled from about 10% to about 100% of the flowrate that would otherwise occur on a volumetric basis in the absence of a control valve. The control system 210 may utilize steam cycle system information to modulate second control valve 302 using a signal transmitted through control line 212. The second control valve 302 may be controlled by and/or receive a control signal from the control system 210 through control line 212, as described in more detail below.

Figure 4:
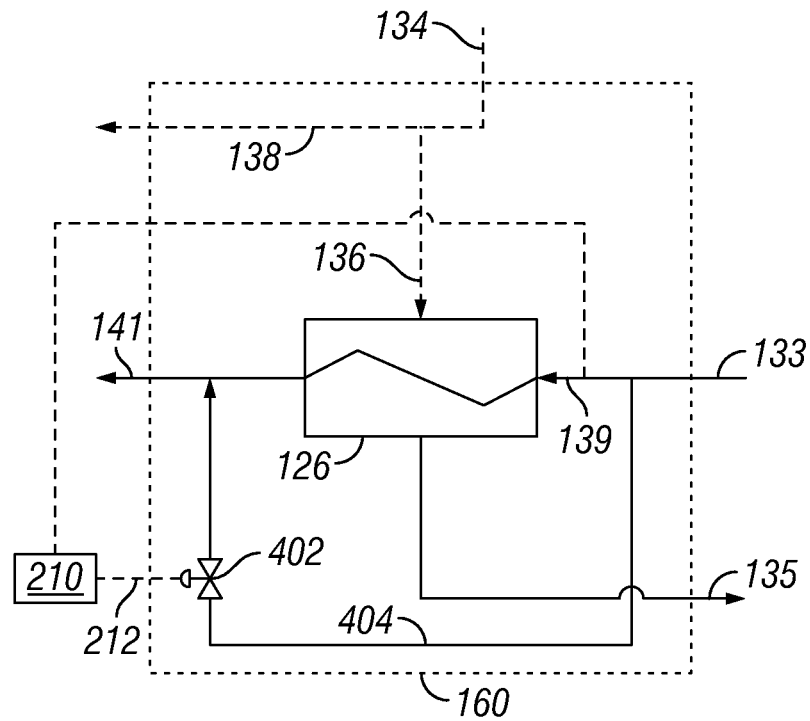
FIG. 4 is an illustration of a schematic flow diagram of still another embodiment of a feedwater temperature control device.

In still another embodiment as shown in FIG. 4, the feedwater temperature control device may comprise a third control valve 402 disposed in a bypass line 404 around the high pressure feedwater heater 126. In an embodiment, the third control valve 402 can be used to control the amount of energy transferred between the steam passing through steam extraction line 136 and the feedwater passing through the high pressure feedwater heater 126. In an embodiment, the third control valve 402 may allow for a modulation of a bypass line 404 of feedwater taken from the line 133. The feedwater passing through line 133 is at a temperature below that of the feedwater leaving the high pressure feedwater heater 126. As the bypass flow around the high pressure feedwater heater 126 increases, the resulting temperature of the feedwater passing to the boiler through line 141 (e.g., the combined steam flow) can be lowered. As a result, the third control valve 402 may be used to control the temperature of the feedwater passing to the boiler through line 141 by modulating the bypass feedwater flow through bypass line 404. In some embodiments with a plurality of high pressure feedwater heaters, the bypass line 404 may bypass all of the high pressure feedwater heaters, drawing from the outlet of the boiler feedwater supply pump 132. In some embodiments with a plurality of high pressure feedwater heaters, the bypass line 404 may only bypass the closest high pressure feedwater heater upstream of the boiler 102. In some embodiments, only one high pressure feedwater heater may be used, and the bypass line 404 may bypass the feedwater flow from near the inlet of the high pressure feedwater heater or the outlet of the boiler feedwater supply pump 132 to a point downstream of the high pressure feedwater heater 126 and upstream of the boiler 102. In an embodiment, the use of the third control valve 402 in the bypass line 404 may allow the steam flow rate through steam extraction line 136 to be varied from about 50% to about 100% of the steam flow that would otherwise occur in the absence of a control valve or a bypass line on a volumetric basis. The extent to which the steam flow rate can be controlled may depend, at least in part, on the resistance provided by the bypass line relative to the resistance of the feedwater heater tube bundles.

In another embodiment (not shown), control valves may be placed in both the bypass line 404 and the line 133 to the high pressure feedwater heater 126 downstream of the point at which the bypass line 404 is taken off the line 133. Such a control arrangement may allow for the relative feedwater flowrates through the high pressure feedwater heater 126 and the bypass line 404 to be controlled over a wide range of conditions. In this embodiment, the steam flowrate may be varied from about 0% to about 100% of the steam flow rate that would otherwise occur in the absence of either control valves or a bypass line on a volumetric basis. The control system 210 may be used to modulate control valve 402 using a signal transmitted through control line 212, as described in more detail below.

Having described the steam cycle system 100, a method of operating a steam cycle power plant will now be described. In reference to FIG. 1, a boiler 102 that may comprise a superheater section 104, a reheater section 106, a boiling section 107, and an economizer section 108 may be used to produce steam that may be transferred to a steam turbine system. The steam turbine system may comprise the high pressure turbine 112 and the lower pressure turbine 114. In an embodiment, the superheated steam from the boiler 102 may pass through the high pressure turbine 112 to generate mechanical energy. The steam passing out of the high pressure turbine 112 may then flow out of the high pressure turbine 112 through steam line 134 before splitting into a first stream that returns to the boiler 102 to enter the reheater section 106 of the boiler, and a second stream that flows to the high pressure feedwater heater 126. The steam passing through the reheater section 106 in the boiler 102 may then pass through the reheat spray section 140 before passing to the lower pressure turbine 114 through line 118. As the reheat steam passes through the lower pressure turbine 114, at least a portion of the energy of the steam may be converted to mechanical energy, which may be converted to electrical energy in the generator 142. The generator 142 may be mechanically coupled to the high pressure turbine 112 and the lower pressure turbine 114. A portion of the steam from the lower pressure turbine 114 may be transferred to a lower pressure feedwater heater 128 through line 121, and the remainder of the reheat steam passing through the lower pressure turbine 114 may be transferred to the condenser 120. The steam passing into the condenser 120 is converted to a liquid and transferred to a feedwater heating system.

In an embodiment, the feedwater heating system may comprise a plurality of feedwater heaters for heating the feedwater prior to the feedwater being fed to the boiler 102. In general, the steam flow to a feedwater heater is unregulated such that the heating requirement needed to raise the feedwater to at or near the saturation temperature corresponding to a given steam pressure dictates the steam flow to the feedwater heater. The resulting steam entering the feedwater heater then condenses in the feedwater heater to produce a liquid level within the feedwater heater that is taken off as a liquid stream.

In an embodiment, the lower pressure feedwater heater 128 may receive the condensed liquid feedwater from the condenser 120 and contact the feedwater with a steam stream passing through line 121. The steam may condense in the lower pressure feedwater heater 128 and then may be transferred to the condenser 120 to become part of the feedwater stream. The feedwater stream leaving the lower pressure feedwater heater 128 may then pass through line 131 to the optional deaerator 130 before passing to the inlet of the feedwater supply pump 132. While not shown in FIG. 1, additional steam extraction lines may be present to allow for steam from any of the turbine outlets to the low pressure feedwater heater 128, the deaerator 130, the high pressure feedwater heater 126, and/or any other units used to process the steam. The feedwater supply pump 132 may increase the pressure of the feedwater and pass the feedwater to the inlet of the high pressure feedwater heater 126. The feedwater may be contacted with an extracted portion of the superheat steam passing through the high pressure turbine 112 to raise the temperature of the feedwater in the high pressure feedwater heater 126. The steam may condense in the high pressure feedwater heater 126 and the resulting liquid stream may be transferred to the optional deaerator 130 where mixing may occur so that that the liquid stream becomes part of the feedwater stream. The resulting heated feedwater stream may then be transferred to the feedwater inlet of the boiler 102.

In an embodiment a feedwater temperature control device may be used to control the temperature of the feedwater stream transferred to the boiler 102. In an embodiment, controlling one or more feedwater temperature control devices may allow the temperature of the feedwater stream transferred to the feedwater inlet of the boiler 102 to be modulated, which may result in an increase in the overall steam cycle system 100 efficiency. In conventional systems, the use of feedwater heaters increases the efficiency of the boiler by reducing the amount of heat, and therefore fuel, necessary to boil the fluid per pound of steam generation. As such, the use of a feedwater heating system can improve the overall efficiency of the steam cycle system. However, the use of a feedwater heating system may also lower the efficiency of the system in a high load event.

Without intending to be limited by theory, a reduction in the temperature of the feedwater transferred to the boiler may increase the steam cycle efficiency in a high load event. In general, the flow of steam through the steam cycle system 100 increases nearly linearly as the demand load, and thus the generated load, increases. The inlet pressure of the high pressure turbine 112 may be controlled to an inlet pressure setpoint that may not change with an increase in the load. However, the outlet pressure of the high pressure turbine 112 may increase in an approximately linear manner with an increase in the load. This pressure change at the steam outlets can have a significant impact on the boiler 102 in two primary ways: (1) the operating pressure of the feedwater heaters can increase, which may increase the feed water temperature to the boiler, and (2) the outlet steam temperature of the high pressure turbine 112 may increase due to higher pressure (due at least in part to less steam expansion) and may provide a higher temperature steam to the inlet of the reheater section 106 of the boiler 102. These changes in the temperature of the reheat steam feed and the temperature of the feedwater may impact the ability of the boiler 102 to control the outlet temperatures of the superheat steam and the reheat steam.

In general, the economizer section 108 of the boiler 102 raises the inlet feedwater temperature and deposits the water in the boiling section 107. The water may then be circulated through the boiling section 107 to generate saturated steam. The superheater section 104 of the boiler 102 may heat the steam towards the superheat steam temperature setpoint. If the temperature of the superheat steam is too high, then a superheat steam temperature control device, such as superheat spray, is applied to cool the superheated steam at the outlet of the boiler to the meet the superheat steam temperature setpoint. In general, the use of the sprays to control the superheat steam temperature or the reheat steam temperature is less efficient than heating the steam to the setpoint temperature within the boiler 102. If the temperature of the superheat steam at the outlet of the boiler is too low, then another steam temperature control device may be applied. For example, the burner tilts may be adjusted to provide more heat to the superheat section of the boiler. However, the superheat steam and reheat steam temperature control range of these devices is limited and may result in increase pollutant emissions from the boiler (e.g., increased $NO_x$ emissions due to higher temperatures in the combustion zone at certain burner tilt angles).

In the event of a high load event where the temperature of the superheat steam is below the superheat steam temperature setpoint, the operating pressure of the high pressure feedwater heater 126 determines the temperature of the feedwater transferred to the feedwater inlet of the boiler if no controls are present. If the temperature of the superheat steam cannot be raised to meet the superheat steam temperature setpoint, then it is believed that the steam production of the boiler 102 may be too high for the heat transfer capacity of the superheater section 104. In other words, it is believed that an excessive amount of heat is being absorbed in the boiling section 107, which does not leave enough heat available to raise the temperature of the superheat steam to meet the superheat steam temperature setpoint. Without intending to be limited by theory, it is believed that if the inlet feedwater temperature were lowered, then the steam production rate of the boiler 102 per unit of fuel input would be lowered allowing the heat available to raise the temperature of the superheated steam to meet the superheated steam temperature setpoint.

In an embodiment, a feedwater temperature control device may be used to reduce the temperature of the feedwater stream transferred to the boiler 102 by reducing the flow of outlet steam to the high pressure feedwater heater 126. In an embodiment, this may be accomplished through the modulation of a control valve in the superheat steam extraction line 136, through the regulation of the water level in the high pressure feedwater heater 126 to control the surface area available for steam to tube heat transfer, and/or by bypassing a portion of the feedwater flow from the inlet to the outlet of the high pressure feedwater heater 126.

In an embodiment shown in FIG. 2, the first control valve 202 may be disposed in the steam extraction line 136 downstream of the split between the line 138 to the boiler 102 and the steam extraction line 136 to the high pressure feedwater heater 126 in addition to any existing shut-off valves in the steam extraction line 136 to the high pressure feedwater heater 126. The first control valve 202 may then be modulated to control temperature of the feedwater transferred to the boiler 102. In an embodiment, the use of the first control valve 202 in the steam extraction line 136 may allow the steam flow rate to be varied from about 0% to about 100% of the flow that would otherwise occur in the absence of a control valve on a volumetric basis. The control system 210 may be used to modulate the first control valve 202 based on one or more inputs to the control system 210, as described in more detail below. The control line 212 may transmit a control signal from the control system 210 to the first control valve 202 disposed in the steam extraction line 136.

In another embodiment as shown in FIG. 3, the feedwater temperature control device may comprise the second control valve 302 for controlling the flow of the condensed steam in the high pressure water heater 126 passing through line 135. The second control valve 302 may allow for a modulation of the liquid flow leaving the high pressure feedwater heater 126 through line 135. The liquid condensed from the steam fed to the high pressure feedwater heater 126 may act as a form of insulation to reduce the tube surface area available to the steam. With a reduced surface area available for heat transfer, the heat transfer from the steam to the feedwater may be reduced, which may result in a corresponding reduction in the feedwater temperature rise across the high pressure feedwater heater 126 and the amount of steam consumed in the high pressure feedwater heater 126. The extent to which the condensed liquid level can be raised within the high pressure feedwater heater 126 may be limited due to the potential risk of turbine water induction as a result of the increased water inventory of the high pressure feedwater heater 126 during an upset condition. As a result of the use of the second control valve 302, the flowrate of the steam through steam extraction line 136 may be modulated from about 10% to about 100% of the flowrate on a volumetric basis that would otherwise occur in the absence of a control valve on the line 135. A control system may be used to modulate the second control valve 302 based on one or more inputs to the control system, as described in more detail below. A control line may transmit a control signal from the control system to the second control valve 302 disposed in the condensed steam passing out of the high pressure feedwater heater 126 through line 135.

In still another embodiment as shown in FIG. 4, the feedwater temperature control device may comprise a third control valve 402 disposed in a bypass line 404 around the high pressure feedwater heater 126. In order to control the bypass flow around the feedwater heaters, the third control valve 402 may be placed in a bypass line 404, which may be in series with any existing shut-off valves (e.g., check valves, shut-off valves). The third control valve 402 may allow for a modulation of a bypass stream 404 of feedwater taken off of the line 133. In this embodiment, a portion of the feedwater flow may be bypassed from the inlet of the high pressure feedwater heater 126 to the outlet of the high pressure feedwater heater 126. The proportion of feedwater flow bypassed may establish the cooling effect on the mixture of the feedwater exiting the high pressure feedwater heater 126 and the bypassed feedwater flow. Bypass lines around each feedwater heater, a group of feedwater heaters, or the highest pressure feedwater heater alone may be used to modulate the temperature of the feedwater transferred to the boiler 102. If the bypass line 404 bypasses a group of feedwater heaters, then the benefit may be decreased but could still achieve the objective of controlling or lowering the feedwater temperature transferred to the boiler. In an embodiment, the use of the third control valve 402 in the bypass line 404 may allow the steam flow rate through steam extraction line 136 to be varied from about 50% to about 100% of the steam flow in the absence of a control valve or a bypass line on a volumetric basis. The extent to which the steam flow rate can be controlled may depend, at least in part, on the resistance provided by the bypass line relative to the resistance of the feedwater heater tube bundles. The control system 210 may be used to modulate the third control valve 402 in a controlled fashion based on one or more inputs to the control system 210, to achieve the desired temperature of the feedwater transferred to the boiler 102, as described in more detail below. The control line 212 may transmit a control signal from the control system 210 to the control valve 402 disposed in the bypass line 404.

In another embodiment, a control valve may be disposed in both a bypass line 404 and the inlet feedwater line 139 (bypass control valve in inlet line not shown) to the high pressure feedwater heater 126 downstream of the point at which the bypass line 404 is taken off line 133, as discussed in more detail above. In this embodiment, the proportion of water bypassing the high pressure feedwater heater 126 may be more closely controlled. In this embodiment, the steam flowrate may be varied from about 0% to about 100% of the steam flow rate that would otherwise occur in the absence of either control valves or a bypass line 404 on a volumetric basis. A control system 210 may be used to modulate control valve 402 using a signal transmitted through control line 212, as described in more detail below.

In an embodiment, the use of a feedwater temperature control device to control the temperature of the feedwater transferred to the boiler may have several impacts on the steam cycle system 100. Controlling the steam flowrate to the high pressure feedwater heater 126 so that the temperature of the feedwater transferred to the boiler is lowered may result in an increase in the temperature of the superheat steam per unit of fuel input, and a corresponding decrease in the total steam flowrate. As steam flow to the high pressure feedwater heater is reduced, the feedwater temperature to the boiler also may be reduced. The reduced temperature of the feedwater results in a reduction of the steam production rate of the boiler 102 and the steam flowrate through the superheating section per unit of fuel input.

A second impact of lowering the steam flowrate to the high pressure feedwater heater 126 may be an increase in the steam flow to the reheater section 106 of the boiler 102 in proportion to the superheater section 104. This result may be accomplished through the reduction of the steam flowrate to the high pressure feedwater heater 126. Additionally, the increased steam flow through the turbine downstream of the reheater section 106 of the boiler 102 (e.g., the lower pressure turbine) may increase the power production of this turbine. As a result of these impacts, it can be seen that control of the temperature of the feedwater passing to the boiler can be used to increase the power production of the lower pressure turbine, to increase the overall power output of the steam cycle power plant.

In an embodiment, a method of controlling the steam cycle system 100 may comprise measuring one or more variables of the steam cycle system 100 and controlling the temperature of the feedwater stream fed to the boiler 102 to allow the temperature of the superheat steam to meet the superheat steam temperature setpoint, allow the temperature of the reheat steam to meet or exceed the reheat steam temperature setpoint, reduce the degree of upward burner tilt adjustment, allow the use of burners lower in the furnace, and/or expand the range of fuel quality that may be effectively burned in the furnace. Lowering the degree of burner tilt, using lower burners in the furnace, and/or applying alternative fuel (e.g., coal) quality may result in decreased $NO_x$ emissions in the boiler flue gas 146 and/or improved economics of the power plant.

In an embodiment, the steam cycle system 100 may be controlled using an appropriate control system. The control system may be any suitable control system or control means for controlling the feedwater temperature control device(s) to reduce the temperature of the feedwater stream received by the boiler 102. The control logic implemented by the control system may accept multiple variables as inputs and implement a multivariable control logic. Suitable inputs may include, but are not limited to, the superheat steam temperature, the superheat steam temperature setpoint, the reheat steam temperature, the reheat steam temperature setpoint, the reheat spray control demand, the temperature of the feedwater entering the boiler, the high pressure feedwater heater temperature rise, the high pressure feedwater heater liquid level, and the high pressure feedwater heater liquid level control output demand. In an embodiment, the control system constraints and targets may include, but are not limited to, obtaining a superheat steam temperature that meets the superheat steam temperature setpoint, reducing the superheat spray flows to about a zero flowrate, obtaining reheat steam temperature that meets or exceeds the reheat steam temperature setpoint and is controlled by the reheat spray flow if necessary, obtaining some degree of feedwater temperature rise in the high pressure feedwater heater 126, maintaining at least a minimal level of steam consumption by the high pressure feedwater heater 126 to maintain a non-return valve in the open position if a non-return valve is present, the high pressure steam turbine 112 high and low load limits, the lower pressure steam turbine 114 high and low load limits, and other steam turbine high and low load limits, and maintaining a water level in the high pressure feedwater heater 126 below a desired level to avoid undue risks for water induction into the turbines during an upset. A suitable control system may be implemented on a computer as known in the art of control systems. A computer is described in more detail hereinafter.

In an embodiment, the steam cycle system 100 may comprise a feedwater temperature control device controlled by a control system. The control system may use any of the variables described above to implement a control system. In an embodiment in which a control valve is used in the steam supply line to the high pressure feedwater heater 126, the control logic may be configured to adjust the steam valve position based on the superheat steam temperature in addition to other parameters. The system constraints also may be considered as they may set operational limits on the amount to which the control logic may control the control valve disposed in the steam line.

In another embodiment, the feedwater temperature control device may comprise a control valve disposed in the condensed steam outlet of the high pressure feedwater heater 126, as described in more detail above. In this embodiment, the control logic may be configured to adjust the flow valve in the condensed liquid line based on the temperature of the superheat steam at the outlet of the boiler along with other parameters. In this embodiment, the allowable upper limit to the water level in the high pressure feedwater heater 126 may serve as a constraint on the system based on safety concerns associated with potential water induction into the turbine during an upset condition. Additional system constraints may also be considered as they may set operational limits on the amount to which the control logic may control the control valve disposed in the steam line.

In another embodiment, the feedwater temperature control device may comprise a bypass line around the high pressure feedwater heater 126 with a control valve disposed in the bypass line and/or a control valve disposed on the inlet steam line to the high pressure feedwater heater 126. In this embodiment, the control logic may be configured to adjust the control valves in the bypass line and/or inlet steam line to the high pressure feedwater heater 126 based on the temperature of the superheat steam at the outlet of the boiler 102 in addition to other parameters. The system constraints may also be considered as they may set operational limits on the amount to which the control logic may control the control valve disposed in the steam line.

In an embodiment, the control line may comprise any type of control signal capable of actuating a control valve in order to modulate the flow of one or more materials through the control valve, and correspondingly the line in which the control valve is installed. Suitable control lines and control signals are known to those of ordinary skill in the art and may include, but are not limited to, electronic signals through an electrically conductive line, and pneumatic signals through a pneumatic control line.

Figure 5:
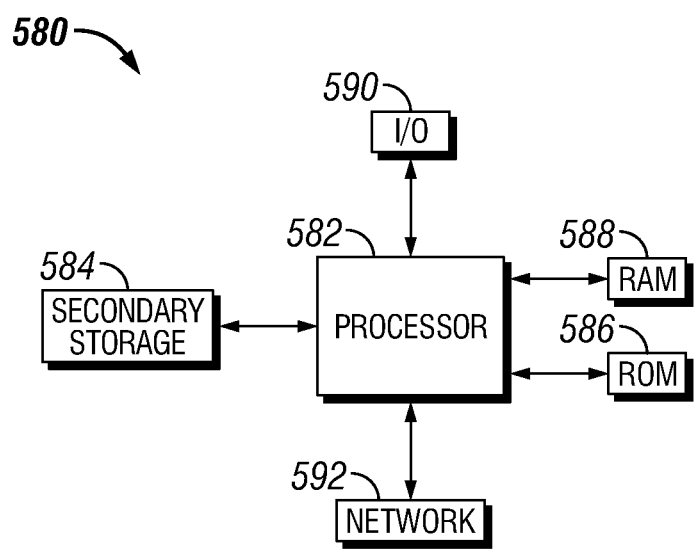
FIG. 5 is an illustrative example of a computer.

The control system described above may be implemented on any computer with sufficient processing power, memory resources, and network throughput capability to handle the necessary workload placed upon it. FIG. 5 illustrates a typical, computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/or the ROM 586 may be referred to in some contexts as computer readable storage media and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data structures in part by directly accessing the computer program product, for example by reading from a CD-ROM disk inserted into a disk drive peripheral of the computer system 580. Alternatively, the processor 582 may process the executable instructions and/or data structures by remotely accessing the computer program product, for example by downloading the executable instructions and/or data structures from a remote server through the network connectivity devices 592. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

In some contexts, a baseband signal and/or a signal embodied in a carrier wave may be referred to as a transitory signal. In some contexts, the secondary storage 584, the ROM 586, and the RAM 588 may be referred to as a non-transitory computer readable medium or a computer readable storage media. A dynamic RAM embodiment of the RAM 588, likewise, may be referred to as a non-transitory computer readable medium in that while the dynamic RAM receives electrical power and is operated in accordance with its design, for example during a period of time during which the computer 580 is turned on and operational, the dynamic RAM stores information that is written to it. Similarly, the processor 582 may comprise an internal RAM, an internal ROM, a cache memory, and/or other internal non-transitory storage blocks, sections, or components that may be referred to in some contexts as non-transitory computer readable media or computer readable storage media.

In an embodiment, the system and method disclosed herein may be used to adjust the electric load generation of a power plant. The peak power in steam power plant can be defined by the state known as turbine valves wide-open, which refers to the load governing valves that are located at the high pressure steam turbine inlet. When the superheated steam is at the set point pressure and temperature and the turbine valves are wide-open, then the steam power system is generating maximum load. One method for obtaining higher peak power is to shut off the high pressure feedwater heater inlet steam valve, which may increase the reheat steam to match the superheat steam, and may thereby increase the steam flow in the low pressure turbine while maintaining the steam flow in the high pressure turbine. The low pressure turbine may generate up to about 66% of the total power of the steam power system, and the increased steam flow through the low pressure turbine may increase the power generation of the system, which may be at a lower efficiency.

Several limitations and/or constraints may limit the maximum load generation of the unit below the peak load capability. In general, the flow through the high pressure turbine valves may be reduced from the wide-open flow to satisfy these constraints. Using the system and methods disclosed herein, the turbine valves may be maintained wide-open and the high pressure feed water heater extraction steam may be controlled to achieve maximum power, while sustaining the minimal efficiency loss. Limitations on the control scheme for obtaining maximum power may include, but are not limited to, the low pressure turbine maximum stage pressures and flows, generator, transformer and other electrical equipment maximum power production, maximum boiler feed water, superheat spray, and/or reheat spray flow, maximum boiler air flow limited by fan power, maximum boiler fuel flow limited by fuel capacity, such as coal mill power, and any combinations thereof. By including the relevant limitations/constraints in a multivariable high pressure feed water heater extraction steam control design, the peak power may be generated while limiting the cycle efficiency loss, where this loss is associated with the reduction in feed water inlet temperature.

In an embodiment, a method of controlling a steam cycle power system to adjust the electric load generation of the power plant may comprise measuring a feedwater stream temperature at the entrance to a boiler in a steam cycle power system, measuring a superheat steam temperature at an outlet of the boiler, measuring a reheat steam temperature at an outlet of the boiler, measuring the electric load generation of the power plant, and controlling the feedwater stream temperature by modulating the steam flow to a high pressure feedwater heater to adjust the electric load generation of the power plant.

In an embodiment, a method of reducing emissions from the steam cycle system 100 may comprise measuring one or more variables of the steam cycle system 100, operating one or more steam temperature control devices at a lower flame temperature, and modulating the temperature of the feedwater stream fed to the boiler 102 to allow the temperature of the superheat steam to meet the superheat steam temperature setpoint, and allow the temperature of the reheat steam to meet or exceed the reheat steam temperature setpoint.

EXAMPLE

In this prophetic example, the steam cycle efficiency increase obtained by lowering the temperature of the feedwater to the boiler is examined. Feedwater heaters can be installed in a power plant steam cycle to improve the overall efficiency of the steam cycle system, that is, higher load production per unit of heat input. As a result, reducing the feedwater heating capacity of the cycle has an adverse consequence on the efficiency of the steam cycle system. However, any efficiency reduction resulting from a decrease in the temperature of the feedwater transferred to the boiler may be more than offset by the efficiency increase arising from higher temperatures of the superheat steam and higher temperatures of the reheat steam. In this prophetic example, an initial operating state based on a feedwater heater outlet temperature of 480° F. is associated with data presented in Table 1 below and a modified operating state based on a feedwater heater outlet temperature of 470° F. is associated with data presented in Table 2 below.

Figure 9:
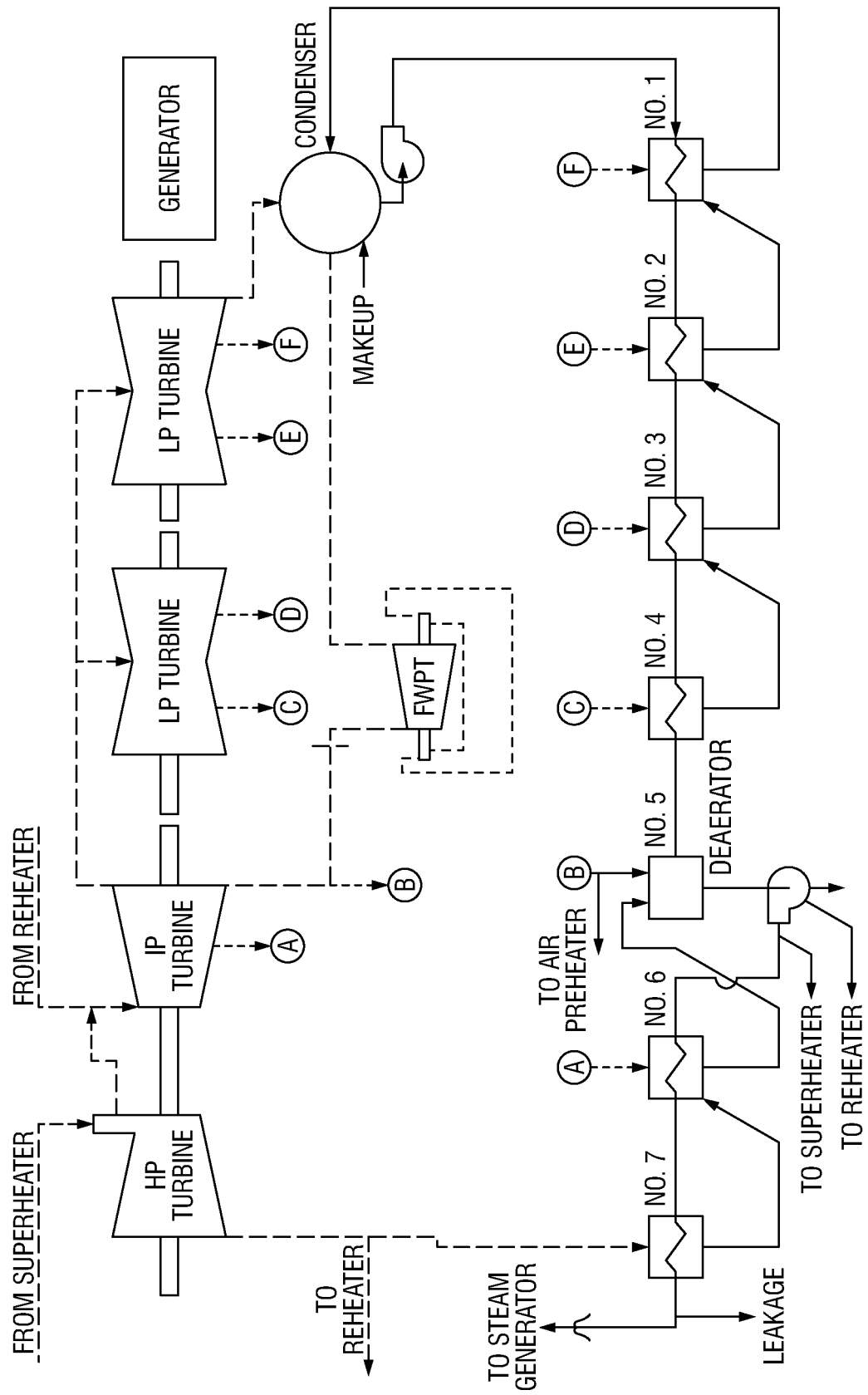
FIG. 9 is an illustration of a steam cycle system according to an embodiment of the disclosure.

As shown in FIG. 9, an exemplary steam cycle system can be used to examine the effects of implementing the methods disclosed herein. In FIG. 9, FWPT stands for feedwater pump turbine, HP turbine stands for high pressure turbine, IP turbine stands for intermediate pressure turbine, and LP turbine stands for low pressure turbine. The steam cycle system illustrated in FIG. 9 has 7 feedwater heaters, No. 1, No. 2, . . . , No. 7. In an initial operating state of the steam cycle system, the operating parameter values are shown in Table 1.

TABLE 1

Assumptions for Steam Power System Calculations

| Parameter | Value |
| --- | --- |
| Boiler Drum Pressure | 2600 psig |
| High Pressure Feedwater Heater Outlet Temperature | 480° F. |
| Boiler Economizer Water Enthalpy Rise | 200 btu/lb |
| Superheater Outlet Steam Temperature to High Pressure Turbine | 960° F. |
| Steam Pressure to High Pressure Turbine | 2400 psig |
| Steam Pressure to Reheat Section of Boiler | 600 psig |
| Steam Temperature to Reheat Section of Boiler (assumes a high pressure turbine efficiency of 89.7%) | 600° F. |
| Reheat Outlet Steam Temperature to Low Pressure Turbine | 975° F. |
| Delta Efficiency feedwater inlet temperature (FIG. 6) | −0.024%/°F. |
| Delta Efficiency superheat temperature (FIG. 7) | −0.017%/°F. |
| Delta Efficiency reheat temperature (FIG. 8) | −0.014%/°F. |
| Calculated Steam/Water properties for Base: | |
| Vapor Saturation Enthalpy at drum pressure | 1080.30 btu/lb |
| Steam Enthalpy at Superheat Steam Pressure & Temperature | 1433.40 btu/lb |
| Feedwater Heater Outlet Enthalpy | 464.86 btu/lb |
| Economizer Water Outlet Enthalpy | 664.86 btu/lb |
| Economizer Water Outlet Temperature | 635.57° F. |
| High Pressure Turbine Steam Outlet Enthalpy to Reheat | 1289.00 btu/lb |
| Reheat Outlet Steam Enthalpy to Low Pressure Turbine | 1503.30 btu/lb |

Figure 6:
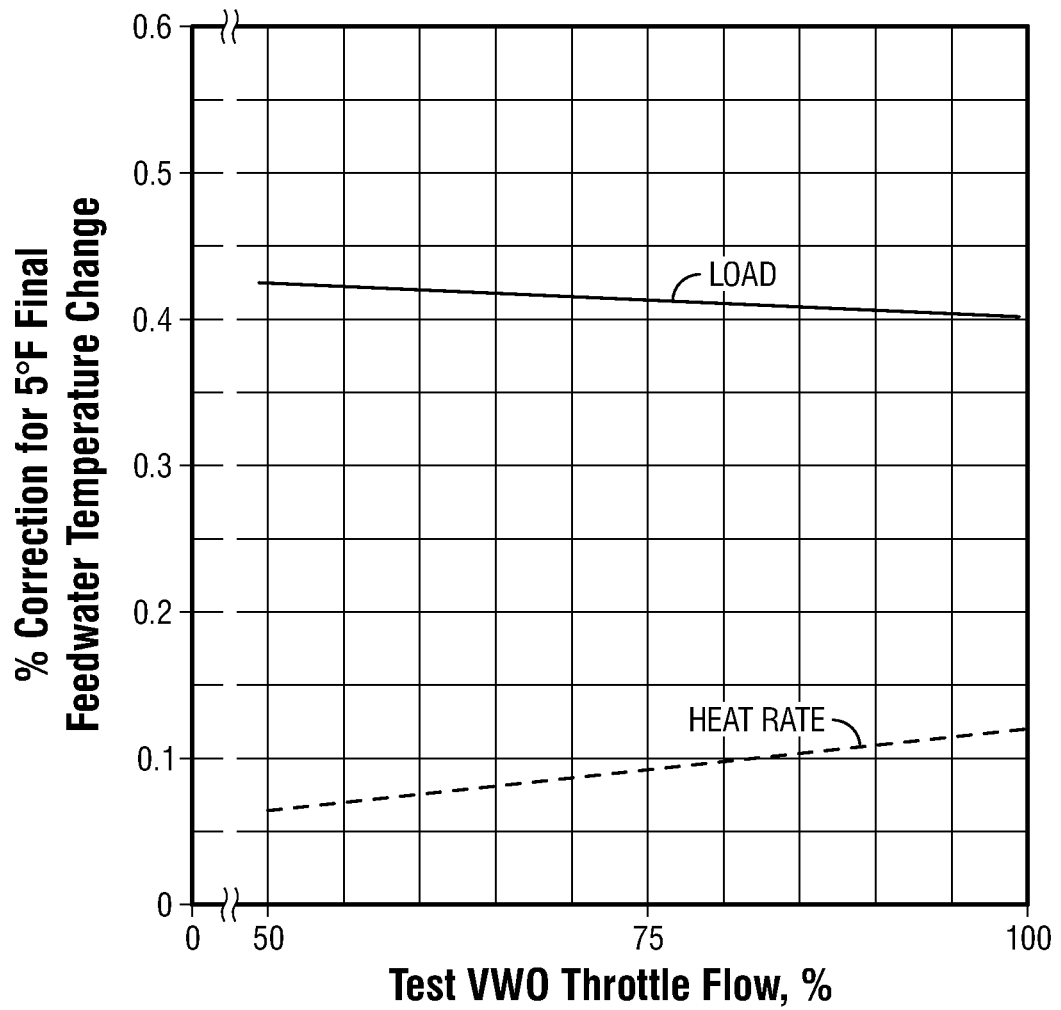
FIG. 6 is a chart illustrating the relationship between the feedwater temperature and the load and heat rate.
Figure 7:
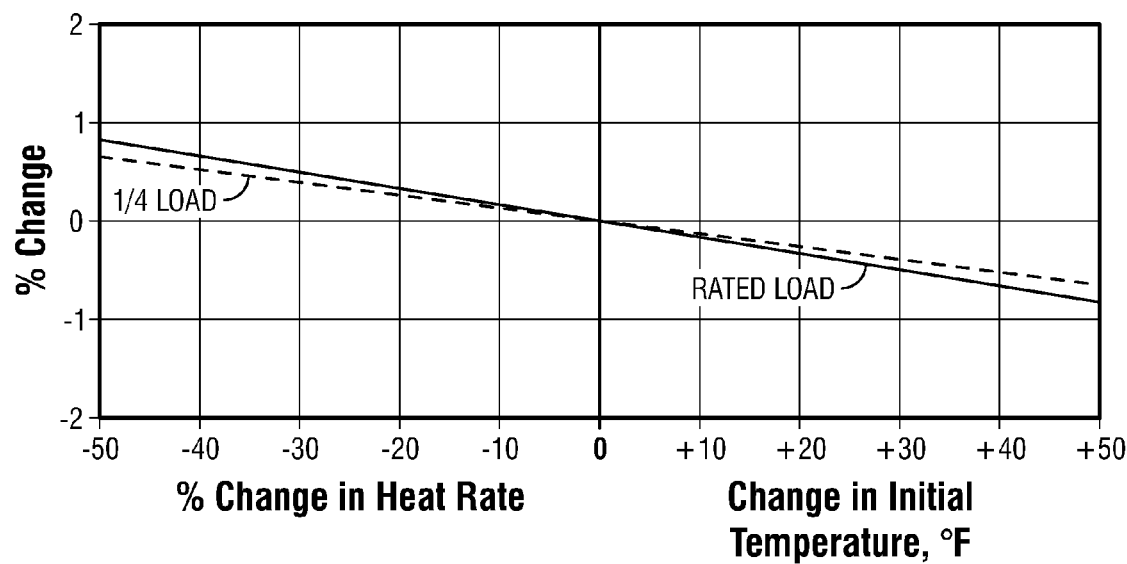
FIG. 7 is a chart illustrating the relationship between the superheat steam temperature and the unit heat rate.

The heat rate factors can be applied through a simple heat balance equation to estimate the affect on the heat rate of the steam cycle system shown in FIG. 9. Turning now to FIG. 6, a plot of unit heat rate correction percentage and load correction percentage based on percentage of valve wide open (VWO) throttle flow is presented. The information of FIG. 6 is based on a 5° F. colder final feedwater temperature change. As shown in FIG. 6, the lower curve illustrates the effect of a 5° F. change in the temperature of the feedwater to the heat rate of the boiler. An increased heat rate corresponds to a decreased efficiency of converting heat to delivered energy, for example delivered electrical energy. The heat rate penalty at full load is about 0.12% for a 5° F. colder feedwater, which may also be expressed as 0.024% per ° F. Turning now to FIG. 7, a plot of unit heat rate change percentage based on a superheat temperature change from a test or nominal superheat temperature operating point is presented. As shown in FIG. 7, at rated load (i.e., full load) a 50° F. increase in superheat steam temperature improves the unit heat rate by 0.85% or 0.017% per ° F. As a result, a ratio of the steam temperature increase to the feedwater temperature decrease greater than 0.24/0.17 (1.41:1) would represent an improvement in the steam cycle system efficiency with an additional benefit of an increase in the energy (i.e., as measured in megawatts "MW") production.

Figure 8:
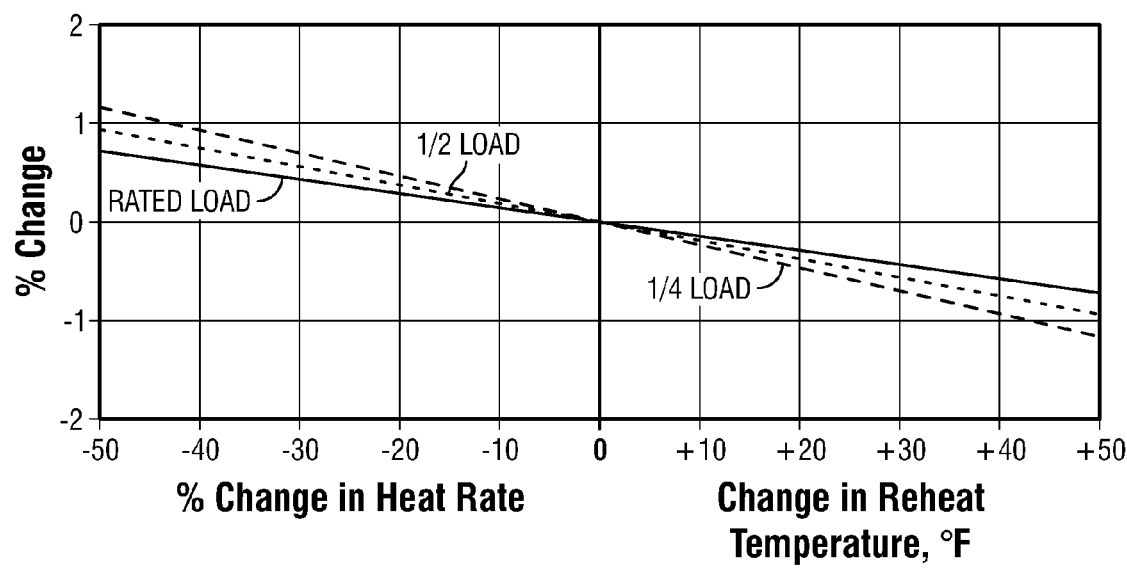
FIG. 8 is a chart illustrating the relationship between the reheat steam temperature and the unit heat rate.

Turning now to FIG. 8, a plot of unit heat rate change percentage based on reheat temperature change from a test or nominal reheat temperature operating point is presented. FIG. 8 presents the temperature of the reheat steam on the steam cycle heat rate. FIG. 8 indicates that at rated load (i.e., full load) a 50° F. increase in reheat steam temperature improves the unit heat rate by 0.7% or 0.014% per ° F. To achieve the lowest heat rate (i.e., the highest efficiency), the objective would be to increase the reheat temperature to setpoint. Therefore, the heat rate benefit from the higher reheat steam temperature may be summed with the heat rate benefit of the higher superheat steam temperature to offset the heat rate penalty of a boiler feedwater with a reduced temperature. It is understood that a decrease in heat rate corresponds to improved efficiency of converting heat energy to delivered energy, for example delivered electrical energy, and hence a decreased heat rate may be referred to as an improved heat rate. An increase in unit heat rate corresponds to decreased efficiency of converting heat energy to delivered energy.

If the operating state of the steam cycle system is modified to achieve a feedwater heater outlet temperature of 470° F., for example by modulating the energy transfer from the outlet steam line 134 to the high pressure feedwater heater 126, the operating parameter values of the modified operating state are shown in Table 2.

TABLE 2

Calculated Values for Steam Power System Example

| | |
|---|---|
| Assumed Feedwater Heater Outlet T | 470° F. |
| Feedwater Heater Outlet Enthalpy | 453.70 btu/lb |
| Economizer Water Outlet Enthalpy (assumes same boiler heat transfer to economizer section as base case) | 653.70 btu/lb |
| Economizer Water Outlet Temperature | 628.62° F. |
| Ratio Superheat Steam Production: Case to Base (assumes same boiler heat transfer to evaporator section as base case) | 0.974 Ratio |
| Superheat Steam Enthalpy Rise (assumes same boiler heat transfer to superheat section as base case) | 362.59 btu/lb |
| Steam Enthalpy at Superheat Steam Pressure & Temperature | 1442.89 btu/lb |
| Superheater Outlet Steam Temperature to High Pressure Turbine | 978.94° F. |
| High Pressure Turbine Steam Outlet Enthalpy to Reheat (assumes high pressure turbine efficiency = 89.7%) | 1298.85 |
| Steam Temperature to Reheat Section of Boiler | 615.02 |
| Ratio Reheat Steam to Boiler: Case to Base | 0.987 Ratio |
| Reheat Steam Enthalpy Rise (assumes same boiler heat transfer to reheat section as base case) | 217.12 btu/lb |
| Steam Enthalpy at Reheat Steam Pressure & Temperature | 1515.97 btu/lb |
| Low Pressure Turbine Steam inlet Temperature | 998.27° F. |
| Estimated Delta Efficiency from feedwater inlet temperature drop | −0.240% |
| Estimated Delta Efficiency from superheat temperature increase | 0.322% |
| Estimated Delta Efficiency from reheat temperature increase | 0.326% |
| Estimated Net Delta Efficiency | 0.408% |
| Ratio Efficiency Increase from superheat temp to Efficiency decrease from feedwater temperature | 1.34 |
| Ratio Efficiency Increase from superheat & reheat temp to Efficiency decrease from feedwater temperature | 2.70 |

The heat rate benefit of an increase in the temperature of the superheat steam exceeds the penalty of a reduced feedwater temperature by a ratio of about 1.3:1. When the increase in the temperature of the reheat steam is considered, the ratio increases to about 2.7:1. For the case of a boiler operating with both superheat and reheat steam temperatures below setpoint, the use of the reduced temperature of the feedwater to the boiler can improve the overall efficiency of the steam cycle system.

This result demonstrates that the control of steam flow to the highest pressure feedwater heater can improve the efficiency of a steam cycle system that has a superheat steam temperature below the superheat steam temperature setpoint. The reduced temperature of the feedwater to the boiler can also provide the side benefit of an increase in the energy production of the steam cycle system and can be applied to reduce emissions through the application of control devices, such as burner tilts and burners in service, to address emissions. The reduced temperature of the feedwater to the boiler can also provide the side benefit of widening the allowable range of fuel quality to address emissions and/or plant economics.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A steam cycle system comprising:
    a boiler comprising a superheat section, a reheat section, and an economizer section, wherein the boiler is configured to receive a feedwater stream;
    a sensor for measuring temperature in the superheat section;
    a steam turbine system comprising a high pressure turbine and a lower pressure turbine, wherein the steam turbine system is configured to receive steam generated by the boiler;
    a condenser configured to receive at least a portion of the outlet steam from the steam turbine system and output the feedwater stream;
    a high pressure feedwater heat exchanger configured to receive at least a portion of the feedwater stream, allow for an energy exchange between the portion of the feedwater stream and a steam stream, and output the portion of the feedwater stream to the boiler;
    a steam extraction line configured to provide a steam flow from an outlet of the high pressure turbine to the high pressure feedwater heat exchanger; and
    a feedwater temperature control device configured to control the temperature of the feedwater stream by modulating the energy transfer in the high pressure feedwater heat exchanger between the steam flow provided through the steam extraction line and the portion of the feedwater received by the high pressure feedwater heat exchanger, the feedwater temperature control device being configured to change the energy available in the high pressure feedwater heat exchanger from the steam flow while maintaining steam flow to the high pressure feedwater heat exchanger; wherein modulating the energy transfer in the high pressure feedwater heat exchanger comprises controlling feedwater stream temperature based on the temperature measured in the superheat section by the sensor.

2. The steam cycle system of claim 1, further comprising a control system to measure a plurality of system variables and provide a control signal to the feedwater temperature control device.

3. The steam cycle system of claim 1, wherein the feedwater temperature control device comprises a control valve disposed in the steam extraction line to adjust the steam flow provided through the steam extraction line received by the high pressure feedwater heat exchanger.

4. The steam cycle system of claim 1, wherein the high pressure feedwater heat exchanger comprises a liquid outlet line, and wherein the feedwater temperature control device comprises a control valve disposed in the liquid outlet line to control a liquid level setpoint of the high pressure feedwater heat exchanger.

5. The steam cycle system of claim 1, further comprising a bypass line configured to bypass a portion of the feedwater stream received by the high pressure feedwater heat exchanger to a point downstream of the high pressure feedwater heat exchanger, and wherein the feedwater temperature control device comprises a control valve disposed in the bypass line.

6. A method of operating a steam cycle power plant comprising:
   producing steam in a boiler, wherein the boiler comprises a superheat section, a reheat section, a boiling section, and an economizer section;
   measuring the temperature of the steam in the superheat section of the boiler;
   transferring the steam to a steam turbine system comprising a high pressure turbine and a lower pressure turbine;
   condensing at least a portion of the steam passing out of the steam turbine system to form a feedwater stream;
   transferring at least a portion of the feedwater stream and a portion of the outlet steam from the steam turbine system to the high pressure feedwater heat exchanger;
   contacting the portion of the outlet steam and the feedwater stream in the high pressure feedwater heat exchanger to transfer energy between the portion of the outlet steam and the feedwater stream;
   transferring the portion of the feedwater stream from the high pressure feedwater heat exchanger to the boiler; and
   controlling the energy available from the outlet steam flow in the high pressure feedwater heat exchanger for transfer between the portion of the outlet steam and the feedwater stream to control the temperature of the feedwater stream received by the boiler while maintaining steam flow to the high pressure feedwater heat exchanger, wherein control of the energy available is based on measuring the temperature of the steam in the superheat section of the boiler and decreasing the energy available to reduce the temperature of the feedwater stream when the measured temperature of the steam in the superheat section of the boiler is below a set point.

7. The method of claim 6, wherein the energy transfer is controlled by modulating a control valve disposed in a steam line between the steam turbine system and the high pressure feedwater heat exchanger to control the flow of steam to the high pressure feedwater heat exchanger.

8. The method of claim 7, wherein the flow of steam to the high pressure feedwater heat exchanger is controlled to between about 0% and about 100% of the steam flow that would otherwise occur in the absence of a control valve.

9. The method of claim 6, wherein the energy transfer is controlled by modulating a control valve disposed in a drain line connected to a condensed steam outlet on the high pressure feedwater heat exchanger to control a liquid level setpoint in the high pressure feedwater heat exchanger.

10. The method of claim 9, wherein the flow of steam to the high pressure feedwater heat exchanger is controlled to between about 10% and about 100% of the steam flow that would otherwise occur in the absence of modulating the control valve.

11. The method of claim 6, wherein the energy transfer is controlled by modulating a control valve disposed in a bypass line for bypassing feedwater from an inlet of the high pressure feedwater heat exchanger to a point downstream of the high pressure feedwater heat exchanger to control the flow of steam to the high pressure feedwater heat exchanger.

12. The method of claim 11, wherein the flow of steam to the high pressure feedwater heat exchanger is controlled to between about 0% and about 100% of the steam flow that would otherwise occur in the absence of a control valve.

13. The method of claim 11, wherein the energy transfer is further controlled by modulating a control valve in a feed water line to the high pressure feedwater heat exchanger.

14. A method of controlling a steam cycle power system comprising:
   measuring a feedwater stream temperature at the entrance to a boiler in a steam cycle power system;
   measuring a superheat steam temperature at an outlet of the boiler;
   measuring a reheat steam temperature at an outlet of the boiler; and
   controlling the feedwater stream temperature based on the measured superheat steam temperature by controlling the energy available in the high pressure feedwater heat exchanger from the steam flow for transfer to the feedwater stream while maintaining steam flow to the high pressure feedwater heat exchanger to: allow the superheat steam temperature to meet a superheat steam temperature setpoint and to allow the reheat steam temperature to meet the reheat steam temperature setpoint.

15. The method of claim 14, wherein the controlling step is carried out using a multivariable control logic.

16. The method of claim 14, further comprising measuring at least one additional variable selected from the group consisting of: a reheat spray control demand, a high pressure feedwater heat exchanger temperature rise, a high pressure feedwater heat exchanger liquid level, and a high pressure feedwater heat exchanger liquid level control output demand.

17. The method of claim 15, wherein the controlling step achieves at least one target selected from the group consisting of obtaining a superheat steam temperature meeting the superheat steam temperature setpoint, reducing the superheat spray flows to about a zero flowrate, obtaining a reheat steam temperature that meets or exceeds the reheat steam temperature setpoint, obtaining at least some feedwater temperature rise in the high pressure feedwater heat exchanger.

18. The method of claim 15, wherein the controlling step is subject to at least one constraint selected from the group consisting of: a superheat steam flowrate greater than the high pressure steam turbine low load limit, a superheat steam flowrate less than the high pressure steam turbine high load limit, a reheat steam flowrate greater than the lower pressure steam turbine low load limit, a reheat steam flowrate less than the lower pressure steam turbine high load limit, and maintaining a water level in the high pressure feedwater heat exchanger below a liquid level setpoint.

19. The method of claim 15, wherein controlling the feedwater stream temperature is achieved by modulating a control valve disposed in a steam extraction line between a high pressure turbine and a high pressure feedwater heat exchanger based on at least the superheat steam temperature.

20. The method of claim 15, wherein controlling the feed water stream temperature is achieved by modulating a control valve disposed in a condensed liquid line exiting a high pressure feedwater heat exchanger based on at least the superheat steam temperature.

21. The method of claim 15, wherein controlling the feedwater stream temperature is achieved, by modulating a control valve disposed in a bypass line of a high pressure feedwater heat exchanger based on at least the superheat steam temperature.

22. The method of claim 14, wherein the controlling step further comprises adjusting the feedwater temperature set point.

23. A non-transitory computer readable medium storing processor executable instructions that, when executed, provide a control signal to a feedwater temperature control device to control the temperature of feedwater provided to a boiler, the control signal based on received measurements from a steam cycle system, said instructions comprising:
   a steam measurement instruction for receiving a superheat steam temperature measurement from a superheat section of a boiler;
   a stream measurement instruction for receiving a feedwater stream temperature measurement from an output stream of a high pressure feedwater heat exchanger, the high pressure feedwater heat exchanger providing feedwater to the boiler;
   a control signal instruction for determining a control signal for the feedwater temperature control device based on the received superheat steam temperature measurement and the received feedwater stream temperature measurement; and,
   a feedwater temperature control device instruction for providing the determined control signal to the feedwater temperature control device to control the temperature of the feedwater stream by modulating the energy transfer in the high pressure feedwater heat exchanger between the steam flow provided through a steam extraction line between a high pressure turbine and the high pressure feedwater heat exchanger and a portion of the feedwater received by the high pressure feedwater heat exchanger, the feedwater temperature control device instruction being configured to change the energy available in the high pressure feedwater heat exchanger from the steam flow while maintaining steam flow to the high pressure feedwater heat exchanger; wherein the determined control signal controls the feedwater temperature control device to modulate the energy transfer in the high pressure feedwater heat exchanger to control the feedwater stream temperature based on the received superheat steam temperature measurement.

24. The computer readable medium of claim 23, wherein the determined control signal is determined using a multivariable control logic.

25. The computer readable medium of claim 23, wherein the determined control signal achieves at least one target selected from the group consisting of: obtaining a superheat steam temperature meeting the superheat steam temperature setpoint, reducing the superheat spray flows to about a zero flowrate, obtaining a reheat steam temperature that meets or exceeds the reheat steam temperature setpoint, obtaining at least some feedwater temperature rise in the high pressure feedwater heat exchanger, and affecting the electric load genera ion.

26. A steam cycle system comprising:
   a boiler comprising a superheat section, a reheat section, and an economizer section, wherein the boiler is configured to receive a feedwater stream;
   a sensor for measuring temperature in the superheat section;
   a steam turbine system comprising a high pressure turbine and a lower pressure turbine, wherein the steam turbine system is configured to receive steam generated by the boiler;
   a condenser configured to receive at least a portion of the outlet steam from the steam turbine system and output the feedwater stream;
   a high pressure feedwater heat exchanger configured to receive at least a portion of the feedwater stream, allow for an energy exchange between the portion of the feedwater stream and a steam stream, and output the portion of the feedwater stream to the boiler;
   a steam extraction line configured to provide a steam flow from an outlet of the high pressure turbine to the high pressure feedwater heat exchanger;
   a feedwater temperature control device configured to control the temperature of the feedwater stream by modulating the energy transfer in the high pressure feedwater heat exchanger between the steam flow provided through the steam extraction line and the portion of the feedwater received by the high pressure feedwater heat exchanger, the feedwater temperature control device being configured to change the energy available in the high pressure feedwater heat exchanger from the steam flow while maintaining steam flow to the high pressure feedwater heat exchanger; wherein modulating the energy transfer in the high pressure feedwater heat exchanger comprises controlling feedwater stream temperature based on the temperature measured in the superheat section by the sensor;
wherein controlling feedwater stream temperature based on the temperature measured in the superheat section by the sensor further comprises adjusting the feedwater temperature set point.

27. The computer readable medium of claim 23, wherein the determined control signal controls the feedwater temperature control device by adjusting the feedwater temperature set point.

* * * * *